United States Patent [19]

Stelljes et al.

[11] 4,001,937
[45] Jan. 11, 1977

[54] PORTABLE POWER DRIVEN BAND SAW

[75] Inventors: Charles R. Stelljes, Fayetteville; Lars Frostad, Syracuse, both of N.Y.

[73] Assignee: Rockwell International Corporation, Pittsburgh, Pa.

[22] Filed: Apr. 28, 1975

[21] Appl. No.: 571,969

[52] U.S. Cl. .................................. 30/380; 83/818
[51] Int. Cl.[2] ........................................ B27B 13/08
[58] Field of Search ............... 30/380; 83/816, 818, 83/824

[56] References Cited
UNITED STATES PATENTS

| | | | |
|---|---|---|---|
| 1,453,335 | 5/1923 | Bennett | 30/380 |
| 1,530,682 | 3/1925 | Lyman | 30/380 X |
| 2,596,081 | 5/1952 | Sacrey | 30/380 |
| 2,825,369 | 3/1958 | Karp | 83/818 |
| 2,969,815 | 1/1961 | Lasar | 83/818 |
| 3,829,970 | 8/1974 | Anderson | 30/380 |

*Primary Examiner*—James L. Jones, Jr.
*Assistant Examiner*—J. C. Peters

[57] ABSTRACT

An improved portable band saw having a unitary, rigid frame or housing, a novel blade tensioning mechanism, an improved drive arrangement for delivering power to the saw, and a more efficient and economical blade guide arrangement.

7 Claims, 10 Drawing Figures

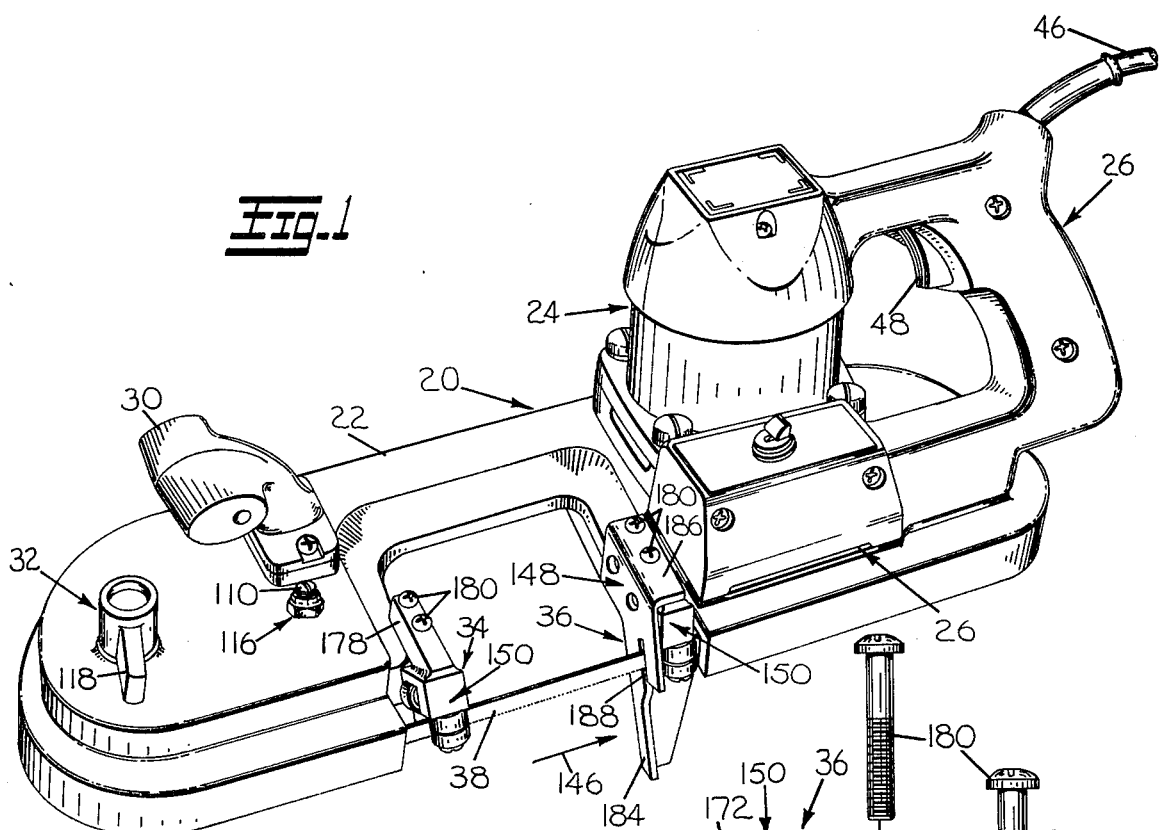
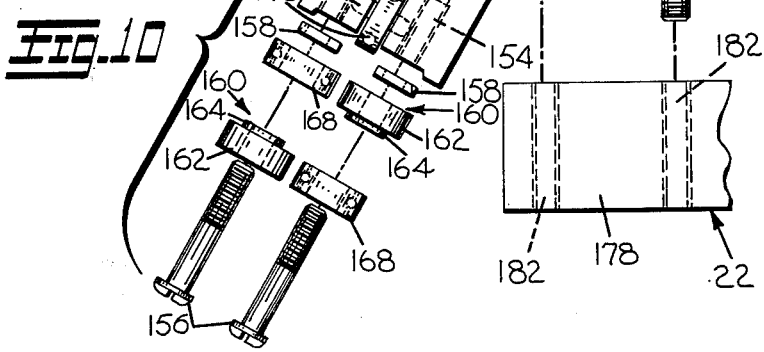
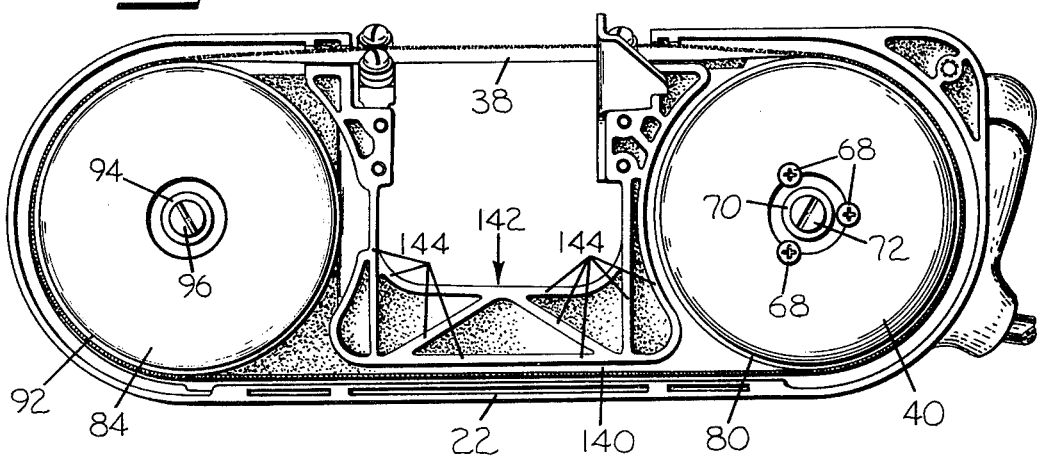

PORTABLE POWER DRIVEN BAND SAW

BACKGROUND OF THE INVENTION

This invention is a new and novel embodiment of a portable band saw extensively used in construction and other outdoor work. Some other portable band saws are constructed with the motor arranged parallel to the run of the blade, across the throat of the saw between the wheels used to drive the saw band. Also, they move the housing of the driven wheel (or pulley) to release and apply the tension of the blade. In addition, previous portable saws used an expensive, inefficient blade guide assembly to turn and retain the saw band in the proper orientation across the cutting run of the band. In the closest art of which I am aware, U.S. Pat. Nos. 1,449,805, 2,596,081, 3,121,910 and 3,566,731, one or more of the above disabilities evidences itself in each showing.

It is a principal object of this invention to provide an improved portable tool with a rigid frame able to stand the rough use of construction work.

It is a further object of this invention to provide greater capacity in a portable tool by moving the motor from the throat area.

Another object is greater power output due to a more efficient power transmission.

It is also an object of this invention to provide a smoother, more powerful tool due to the novel blade guides.

A further object is to provide a saw which is simple to operate, durable in use and economical to manufacture.

SUMMARY OF THE INVENTION

This invention pertains to a portable band saw in which the expensive, power-costly worm or bevel gear drive is replaced by spur gears and the motor is relocated to a place on the housing where it is out of the way of the work. The housing has been made a stable, rigid element by means of novel take-up mechanism mounting the idler pulley. Also incorporated is an adjustment whereby the idler pulley may be adjusted for alignment without dismantling and "shimming" the idler pulley mounting. Added to these was an improved novel, economical blade guiding mechanism to produce a more efficient, economical, rugged tool that is easier to operate and simpler in construction.

BRIEF DESCRIPTION OF THE DRAWINGS

FIG. 1 is a perspective view of the preferred embodiment of the present invention;

FIG. 2 is a bottom view of the saw;

FIG. 10 is a view similar to FIG. 9 with the parts in an exploded view, and the work engaging abutment left off for clarity.

DESCRIPTION OF THE PREFERRED EMBODIMENT

Figure 3:
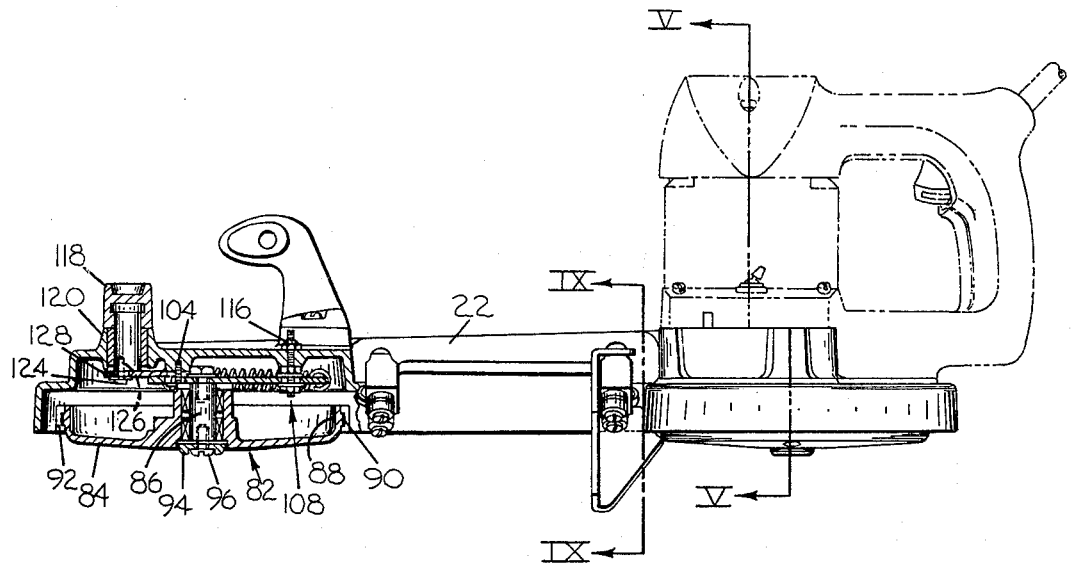
FIG. 3 is a front view, with a portion of the idler wheel area in section.

This band saw includes generally a unitary casing, housing or frame, wheels mounted on the frame at opposite ends thereof in recesses designed to accommodate them, a saw band running over the wheels with an exposed portion defining a cutting zone, a motor and reduction gears mounted on one portion of the frame for driving one of the wheels, a novel idler take-up mechanism mounting the other of the wheels, and guide means located to twist the saw band as it passes through the cutting zone.

FIG. 1 is a perspective view of a band saw 20 consisting of a housing or frame 22 having mounted on it a motor assembly 24, a control handle 26, a speed selector 28, an auxiliary handle 30, an idler take-up assembly 32, and guide roller assemblies 34 and 36, for guiding saw blade 38. Journalled underneath the housing or frame 22 is a drive wheel 40, connected in driving relationship to motor 42 by drive train 44 (see FIG. 5). Power to the motor is supplied through cord 46, an on-off switch (not shown) in control handle 26 and operated by trigger 48, thence through speed selector 28 to two-speed motor 42. The power control means and the electric motor are conventional elements which may be varied; i.e., a variable speed switch and compatible motor, or a simple on-off switch and single speed motor may be used. All these combinations are well-known and commonly used, and it is to be understood that the requirements of the particular service for which the tool is intended will dictate these elements.

Figure 4:
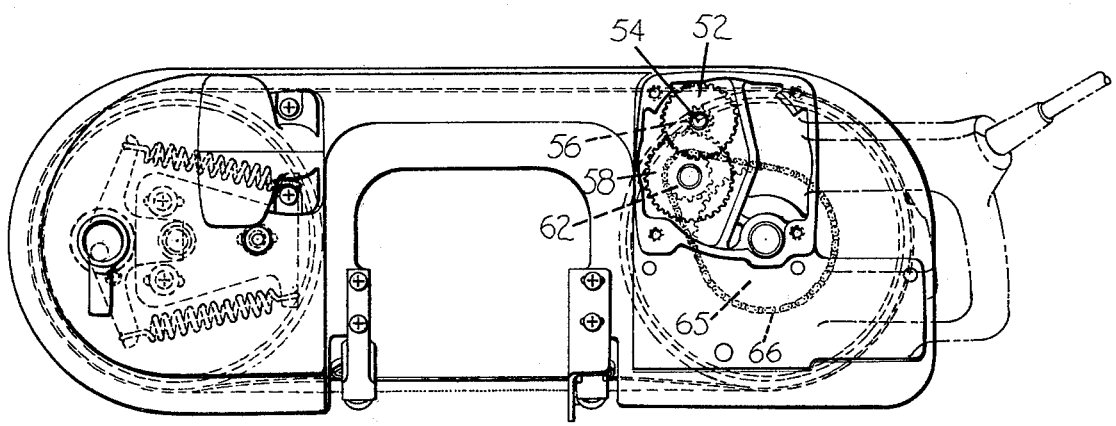
FIG. 4 is a top view, with the idler wheel mounting area in phantom lines, and the drive wheel area having the motor and speed selector removed for clarity.
Figure 5:
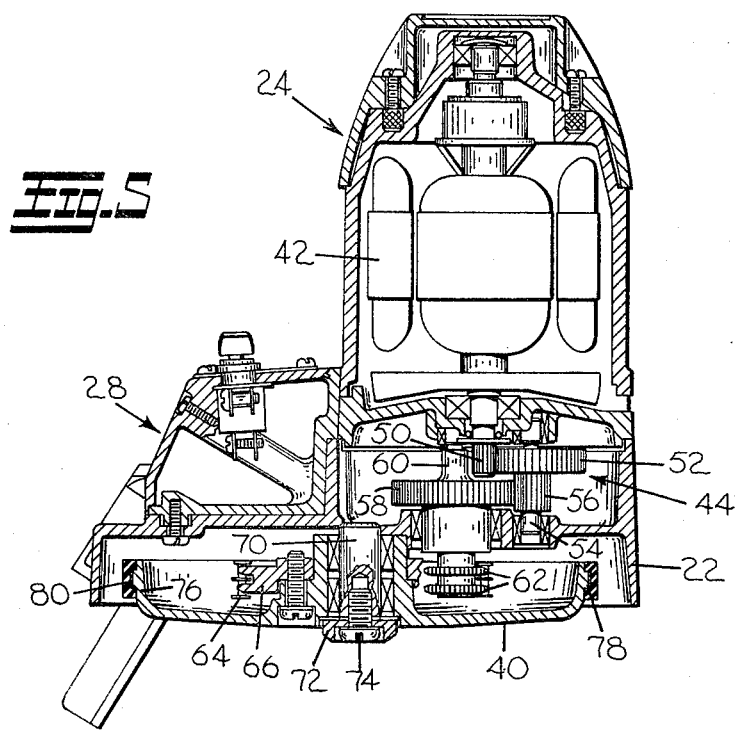
FIG. 5 is a sectional view along the section line V—V of FIG. 3.

With reference to FIGS. 4 and 5, the motor armature has a pinion gear 50 fixed on the end which drives a gear 52 fixed to shaft 54 journalled in the housing 22. Also fixed on shaft 54 is pinion 56 which is in mesh with (and drives) gear 58 fixed to shaft 60. Shaft 60, also journalled in housing 22 has sprocket 62 fixed to the lower end. Chain 64 meshes with and is driven by sprocket 62 and, in turn, drives sprocket 66 which is fixed to drive wheel 40 by bolts 68 (see also FIG. 2). Drive wheel 40 is journalled and boss 70 of housing 22 and is retained by cover member 72 and screw 74 threaded into boss 70.

Drive wheel 40, in the preferred form, is a cast metal wheel with an inwardly turned flange 76 on its periphery. As seen in FIG. 5, this flange is shaped with a ridge 78 for retaining a resilient band (or "tire") 80 tightly encircling flange 76. The band 80 provides frictional drive to saw blade 38 and helps protect against wear of the blade and the wheel.

Figure 8:
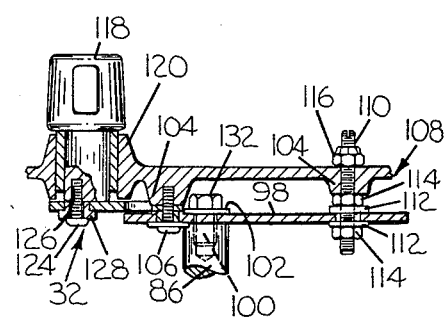
FIG. 8 is a section along VIII—VIII of FIG. 7.

Turning now to idler wheel assembly 82, idler wheel 84 is journalled on stub shaft 86, which in turn is fixed on idler take-up assembly 32 (see FIGS. 3 and 8). Idler wheel 84 is similar in size and shape to drive wheel 40, having an inturned flange 88, ridge 90 and resilient "tire" 92. Still with reference to FIG. 3, idler wheel 84 is retained on stub shaft 86 by a cover member 94 and a screw 96 threaded into shaft 86.

As seen in FIG. 8, stub shaft 86 is fixed to a mounting plate 98 by bolt 100 and lock washer 102. Mounting plate 98 is slidably mounted on bosses 104 cast on the under side of housing 22 by screws 106 and adjustment assembly 108. Mounting plate 98 is slotted to allow movement toward and away from drive wheel 40 in a plane perpendicular to the axes of the wheels. Adjustment assembly 108 is used to align mounting plate 98 for movement in this plane. A threaded stud 110 is threaded completely through the boss 104 closest to the drive wheel 40 and carries one end of mounting plate 98 slidably retained between washers 112 and nuts 114 (FIGS. 3 and 8). A lock nut 116 on stud 110 on the exterior of housing 22 keeps stud 110 in the desired position with relation to the housing. If a small adjustment in the axis of idler wheel 84 is necessary, nut 116 is loosened, then stud 110 is turned to adjust mounting plate 98, thus adjusting stub shaft 86 and the idler wheel 84 mounted thereon.

Figure 6:
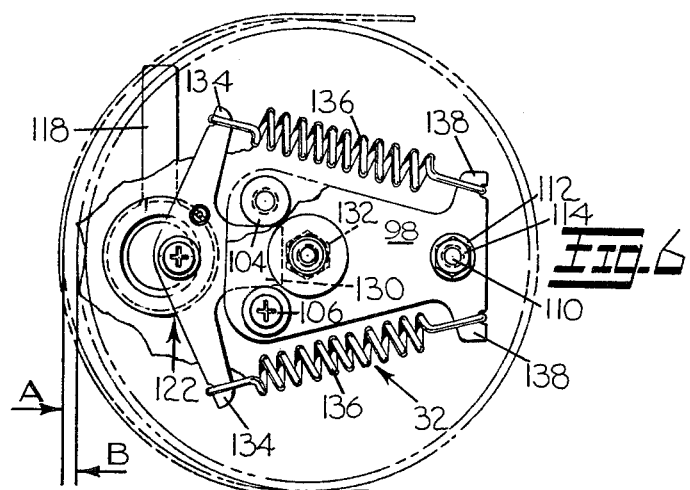
FIG. 6 is an enlarged view of the idler wheel mounting means, shown in the relaxed position, for changing saw blades.
Figure 7:
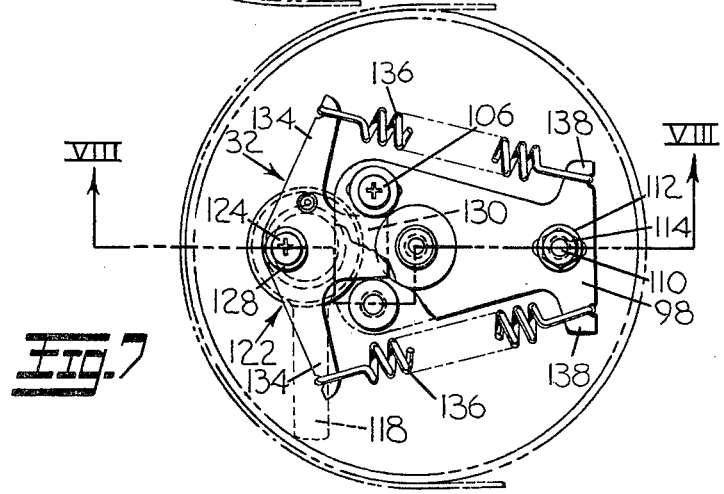
FIG. 7 is the same view of FIG. 6, but with the assembly in the position for cutting, the blade being tensioned.

Idler take-up assembly 32 facilitates changing saw bands by moving toward drive wheel 40, then after replacement of blade 38, the assembly is moved away from drive wheel 40 to tension the saw band. FIG. 1 shows operating handle in the operating, or tensioned, position. As seen in FIGS. 3 and 8, handle 118 is journalled in a boss 120 of housing 22 located on the longitudinal axis of the saw, and outside the stub shaft 86. Fixed to the bottom of handle 118 for movement therewith to positions along the longitudinal axis as shown in FIGS. 6 and 7, is an approximately tee-shaped member 122. This member is attached to handle 118 by bolt 124 mounted in a threaded hole 126 located eccentrically in the bottom of handle 118. Relative rotation between bolt 124 and tee 122 is permitted by use of bushing 128 located in tee 122. Tee-shaped member 122 has a base portion 130 dimensioned to slide between mounting bosses 104, and to bear against the head 132 of stub shaft bolt 100 when the take-up assembly is in the position shown in FIG. 6 (the "relaxed" position for changing blades). The arms 134 of tee-shaped member 122 each mount one end of springs 136. The other end of each spring is connected to an "ear" 138 on mounting plate 98. Thus it can be seen that mounting plate 98 (and stub shaft 86 and idler wheel 84) is resiliently biased towards tee-shaped member 122, and base portion 130 of member 122 positively moves plate 98 to the right (as seen in FIGS. 3, 6, 7 and 8) when the operating handle is rotated to the position where eccentric hole 126 is in the position shown in FIG. 6. This moves idler wheel 84 to the right as seen in FIG. 6 to the position indicated by line "B". When the operating handle is moved to the position shown in FIG. 7, the idler wheel takes up the position indicated by line "A" of FIG. 6, if the saw band allows this much movement. The resilient connection of springs 136 in the tensioning direction provides for differences in band length.

The path of the saw blade from the drive wheel 40 to the driven (idler) wheel 84 takes it along the channel-like recess 140 (see FIG. 2) in strut member 142 which connects the wheel wells. Strut member 142, with stiffening ribs 144, is part of the integral housing 22 and makes a unitary, rigid structure with the wheels wells. The saw blade is accordingly recessed in housing 22 for its entire run, except the cutting area between the guide roller assemblies, where the blade is moving in the direction of the arrow 146 in FIG. 1. In this cutting area, blade 38 is given a twist by blade guide 34 and kept that way for the length of the exposed run by blade guide 36. After passing blade guide 36, the blade returns to another orientation parallel to the axes of the pulleys 40 and 84. In order to produce this twisting action, in which the cutting edge is twisted outward away from the longitudinal axis of the tool, novel guides have been developed.

Guide roller 36 has associated with it work engaging abutment 148 overlying roller holder 150, but as can be seen from FIG. 1, in all other respects, guide roller assembly 34 and guide roller assembly 36 are mirror images of each other, and therefore only one will be completely described herein. With continued reference to FIG. 1 and with reference to FIGS. 9 and 10 also, the roller holder 150 is a two legged block with rollers in one leg and provision for adjustably mounting to the housing 22 in the other leg, which can be any angular relation to the first leg, but in the preferred embodiment is approximately 120° of included angle. The one leg 152 has a pair of tapped holes 154 (one only shown in FIG. 9) drilled and tapped parallel to the longitudinal axis of leg 152, and spaced apart the proper distance to mount ball bearings in a manner to be described below and accommodating a saw blade 38 between them. Threaded into these holes are bolts 156 each having mounted thereon a spacer 158 and a stepped guide 160. The stepped guides 160 have a constant bore for receiving bolts 156 and have a large outer diameter 162 at one end, and a smaller diameter 164 on the other end adjacent to a ball bearing 168. These ball bearings provide the twist to the saw blade. To accomplish this, the stepped guides 160 and the ball bearings 168 for each guide roller assembly are assembled as shown in FIG. 10. The ball bearing 168 and the stepped guide 160, for the inner one are placed on the bolt 156 with the ball bearing adjacent the bolt head. A spacer 158 is then placed on bolt 156, and the assembly is then threaded into the tapped hole 154 nearer the housing 22. The other bolt 156 receives the assembly of the stepped guide 160 and ball bearing 168 with the bearing farthest from the head of bolt 156. A spacer 158 is also assembled on the bolt and this assembly is then threaded into tapped hole 154 farther from housing 22.

Figure 9:
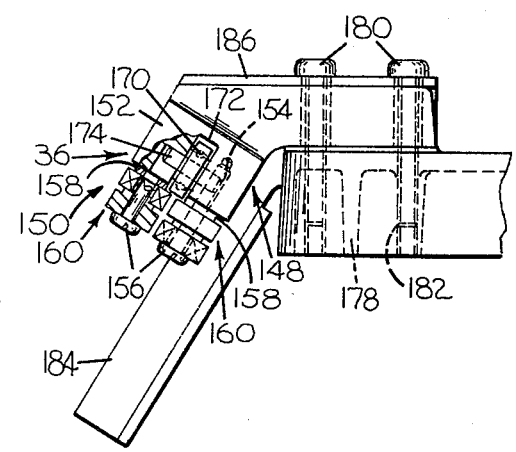
FIG. 9 is a view of one blade guide along IX—IX of FIG. 3, with part of the blade holder broken away to show the mounting of the guide rollers.

Another element of each guide roller assembly is a back-up roller 170, seen in FIGS. 9 and 10. This roller, mounted in a recess 172 on a shaft 174, is mounted on an axis perpendicular to the mounting axis of bolts 156. This roller 170 takes the axial cutting force from the blade 38, and maintains it in the proper relative relationship with the other rollers.

The other leg 176 of the roller holder 150 has suitable provision for mounting each roller holder to a boss on the housing 22. In this showing (see FIGS. 1, 9 and 10) the roller holders 150 are secured to the bosses 178 by screws 180. These screws 180 are threaded into tapped holes 182 in the bosses 178, but go through a slightly larger hole in roller holder 150 for alignment of the rollers with each other and with blade 38.

In addition to roller holders 150, the boss 178 nearest drive wheel 40 mounts a work engaging abutment 148 (FIGS. 1 and 9). This member is secured to boss 178 by the same screws 180 that hold roller 150. Abutment 148 has a main work-engaging surface 184 and a mounting surface 186 that engages the top and one face of the roller holder 150. A slot 188 is provided in the work-contacting surface 184 in alignment with the space between the rollers mounted on holder 150 for passage of blade 38. These abutments are commonly provided on portable band saws to take the thrust from the work as the blade pulls the work in that direction relative to the saw.

We claim:

1. A portable, hand-manipulated band saw comprising, a driving pulley and an idler pulley, a continuous band-type saw blade mounted on said pulleys, motor drive means connected to said driving pulley, tension control means connected to said idler pulley, handle means and motor control elements, blade guide means providing a blade cutting plane rotated relative to a plane tangent to the peripheries of the pulleys, and a frame means supporting said pulleys, said motor drive means, said tension control means, said handle means and said blade guide means, said frame means providing cutting capacities wherein blade depth penetration at full width of cut and rip cut width capacity are each at least 50% of the diameter of said pulleys, a pair of blade guide roller assemblies for twisting the blade in order to give greater cutting capacities of said band saw, each said guide roller assembly comprising a pair of roller assemblies at an end of the cutting run of the blade mounted on a roller holder, each said roller assembly comprising a guide and a low friction bearing mounted on a bolt, said guide having stepped outside dimensions, the larger of which is approximately equal to the outer dimension of said bearing, and said roller holder being adjustably fixed to said band saw.

2. The roller assemblies of claim 1 wherein said guide has a reduced dimension located between said low friction bearing and said large diameter, thereby providing a spacer between same.

3. The roller assemblies of claim 1 wherein said pair of roller assemblies are mounted with said bearings in offset relationship to each other.

4. The guide roller assembly of claim 1 in which a back-up low-friction bearing is inset in said roller holder perpendicular to the longitudinal axes of said roller assemblies, whereby said back-up bearing provides support for said blade during cutting operations.

5. A portable hand-manipulated band saw comprising, a driving pulley and an idler pulley, a continuous band-type saw blade mounted on said pulleys, motor driven means connected to said driving pulley, tension control means connected to said idler pulley, handle means and motor control elements, blade guide means providing a blade cutting plane rotated relative to a plane tangent to the peripheries of the pulleys, a frame means supporting said pulleys, said motor drive means, said tension control means, said handle means and said blade guide means, said frame means providing cutting capacities wherein blade depth penetration at full width of cut, and rip cut width capacity are each at least 50% of the diameter of said pulleys, a blade tensioning mechanism comprising boss mounting means on said housing inside one wheel compartment and having mounted thereon a plate carrying an idler wheel on a stub axle, said plate being movable toward and away from the drive wheel by means projecting through said frame for manual actuation, said idler wheel being resiliently biased in a direction for tensioning said blade, said mechanism having actuating means connecting said means projecting through said frame with said plate whereby said plate is moved by selective manipulation of said means projecting through said frame, and wherein adjustment means for aligning the axis of the stub axle relative to the axis of the drive wheel of said saw is mounted on said housing to engage said plate, said adjustment means being accessible from the exterior of the housing of said saw.

6. The adjustment means of claim 5 comprising means for adjusting one end of said plate relative to said housing, thereby varying the angle said stub axle makes with the run of the blade, resulting in better tracking of the blade over said idler wheel.

7. The adjustment means of claim 5 comprising a screw threaded through one of said boss mounting means elements and being connected to said plate.

* * * * *